June 20, 1933. G. W. SCHODDE 1,914,533
SCOURING AND POLISHING IMPLEMENT
Filed Nov. 20, 1931
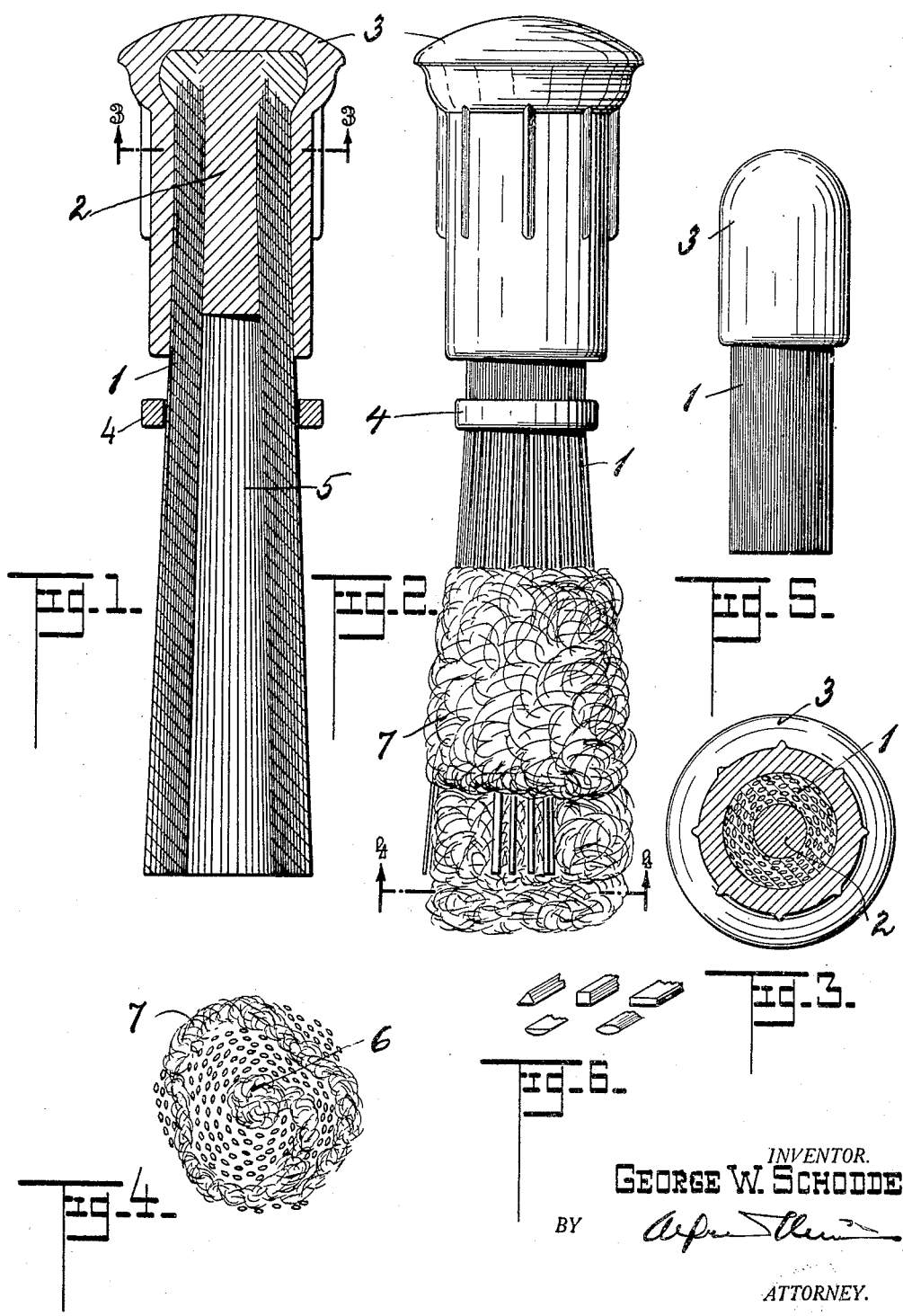
INVENTOR.
GEORGE W. SCHODDE.
BY
ATTORNEY.

Patented June 20, 1933

1,914,533

UNITED STATES PATENT OFFICE

GEORGE W. SCHODDE, OF NEWARK, NEW JERSEY

SCOURING AND POLISHING IMPLEMENT

Application filed November 20, 1931. Serial No. 576,228.

My invention relates to scouring and polishing implements. An object of the present invention is to produce an implement of this kind whereby kitchen utensils, such as pots, pans or the like, and more especially those known as aluminum ware, can be quickly, thoroughly and effectively cleaned and afterwards polished. Another object of the present invention is to produce an implement that will stand hard use, that will give service for a long period of time, will not accumulate and hold any dirt and whose scouring qualities will not wear off. Furthermore, the implement embodying my invention is so constructed that it can be quickly and cheaply made and, therefore, is inexpensive.

For a complete disclosure of my invention, I refer to the following detailed description and the annexed drawing whereon a preferred embodiment of the invention is shown by way of illustration and in which Fig. 1 is a central longitudinal section through the implement;

Fig. 2 is a picture of the complete implement shown wrapped at its forward end with a wadding of steel wool;

Fig. 3 is a cross-section along line 3—3 in Fig. 1;

Fig. 4 is a cross-section along line 4—4 in Fig. 2;

Fig. 5 is a picture of a small-size implement embodying the invention and

Fig. 6 shows various cross-sections of steel wires used in the implement.

As shown in the drawing, the implement comprises a plurality of thin resilient wires, preferably steel wires, indicated at 1 and assembled at one end around a plug 2 so shaped that the forward ends of the wires will remain separated for the purpose mentioned below. The plug 2 together with the surrounding ends of the wires is tightly set in a grip-handle 3, which may be made of vulcanized rubber, wood, or any other suitable material. The main thing is that the wires are firmly held together so as not to work loose and become detached from the grip-handle.

If the inner plug 2 is selected of metal, then the ends of the wires surrounding the plug may be welded thereto and to each other as shown in Fig. 1, in which event it will be impossible for the wires to work loose and become detached. At 4 is shown a ring, or collar, capable of being moved along over the wires which at their forward ends are spread apart, as shown in Fig. 2. If, however, the ring, or collar, 4 is displaced along the wires toward their forward ends, the wires will be closed upon each other for the purpose hereinafter described.

As shown in Figs. 1 and 2, the thin wires project from the grip-handle 3 for a sufficient length, so that they will maintain their full resiliency even when used for a long time.

The front ends of the wires have sharp small edges so as to exert a good scraping and scouring action, and likewise the longitudinal edges of the wires are sharp so that when the implement is used with a sidewise motion, the edges also will act as scrapers.

In the embodiment of the implement shown in the drawing, the wires are of oval or double curvilinear cross-section, but as shown in Fig. 6, any other cross-section may be selected, to wit square, rectangular, triangular, semi-oval etc., the essential requirement being that sharp edges are produced extending for practically the entire length of the wires.

When the wires of the implement are left freely extending, the implement is used for scraping and scouring purposes, and if an especially effective scraping action of the sharp front ends of the wires is desired, then the ring, or collar, 4 is moved forwards so as to push the free ends of the wires more closely toward each other.

After the implement has been used as a scouring and scraping implement, a wadding of steel wool is tightly wrapped around the forward ends of the wires projecting beyond their front ends about an inch, or so. To this end, the plug 2 at the inner ends of the wires where they emerge from the grip-handle 3 is provided, for by said plug, an open space 5, as clearly seen in Fig. 1, is provided between the wires. Into this open space 5 is inserted at the front ends of the wires the thickened end 6 of the steel wool wadding 7, which is passed in and out between the free ends of the wires and is finally wrapped completely in one or more turns around the wires. If thereupon the ring, or collar, 4 is moved forwards, the wires will be "closed" and will tightly grip the steel wool and hold it firmly in place. The implement then is ready to be used as a polishing implement. Instead of a ring, or collar, of course, any other suitable means may be employed for "closing" the wires at their forward ends.

In Fig. 5 there is shown a small-size implement of this kind, from which the ring, or collar, is omitted.

As will appear from the foregoing description and the drawing, a very useful and efficient implement has been produced which has a powerful scraping and scouring action when properly used and which at the same time can be used as a polishing implement.

I do not, of course, limit myself to the precise embodiment of the invention as shown, because the same is capable of many variations and modifications within ordinary skill falling within the scope of this invention.

I claim:

A scouring, scraping and polishing implement, comprising a plug, a plurality of steel wires set around said plug, the freely extending forward ends of said wires being spread apart by said plug and adapted to have intertwined therebetween a wadding of steel wool, or the like, having a thickened end adapted to be inserted into the open space formed at the forward ends of said wires, and a slide-member movable along and over said wires for tightening the forward ends of said wires around said wadding of steel wool.

In testimony whereof I affix my signature.

GEORGE W. SCHODDE.